(12) United States Patent
Okada et al.

(10) Patent No.: US 11,498,497 B2
(45) Date of Patent: Nov. 15, 2022

(54) COMMUNICATION DEVICE AND CONTROL METHOD

(71) Applicant: Sumitomo Wiring Systems, Ltd., Yokkaichi (JP)

(72) Inventors: Ryo Okada, Yokkaichi (JP); Genta Yamane, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 162 days.

(21) Appl. No.: 16/973,183

(22) PCT Filed: May 27, 2019

(86) PCT No.: PCT/JP2019/020912
§ 371 (c)(1),
(2) Date: Dec. 8, 2020

(87) PCT Pub. No.: WO2019/235286
PCT Pub. Date: Dec. 12, 2019

(65) Prior Publication Data
US 2021/0253047 A1    Aug. 19, 2021

(30) Foreign Application Priority Data

Jun. 8, 2018 (JP) .............................. JP2018-110551
Dec. 7, 2018 (JP) .............................. JP2018-230275

(51) Int. Cl.
*H01R 12/00* (2006.01)
*B60R 16/023* (2006.01)
*H04L 12/403* (2006.01)

(52) U.S. Cl.
CPC ...... *B60R 16/0238* (2013.01); *B60R 16/0234* (2013.01); *H04L 12/403* (2013.01)

(58) Field of Classification Search
CPC ... H01R 9/226; H04L 12/403; H04L 12/4035; B60R 16/23; B60R 16/0238; B60R 16/0232; B60R 16/0234
(Continued)

(56) References Cited

U.S. PATENT DOCUMENTS 5,884,018 A   3/1999  Jardine et al.
6,704,298 B1  3/2004  Matsumiya et al.
(Continued)

FOREIGN PATENT DOCUMENTS

JP    H6-1193603 A    4/1994
JP    2010-140159 A   6/2010

OTHER PUBLICATIONS

International Search Report, Application No. PCT/JP2019/020912, dated Jun. 25, 2019. ISA/Japan Patent Office.

*Primary Examiner* — Khiem M Nguyen
(74) *Attorney, Agent, or Firm* — Honigman LLP

(57) ABSTRACT

Provided is a communication device and a control method, according to which in a configuration in which a plurality of processing units having a master-subordinate relationship therebetween, processing for controlling an abnormality and the like that has occurred in the subordinate processing unit can be performed by the master processing unit. A communication device includes a master processing unit and a subordinate processing unit, and the subordinate processing unit performs processing regarding communication, the master processing unit controls activation of the subordinate processing unit, the subordinate processing unit periodically transmits a signal to the master processing unit, and the master processing unit controls an operation of the subordinate processing unit in accordance with the signal that is periodically transmitted by the subordinate processing unit.

9 Claims, 9 Drawing Sheets

(58) Field of Classification Search
USPC .............................................. 439/76.1, 76.2
See application file for complete search history.

(56) References Cited

U.S. PATENT DOCUMENTS

| | | |
|---|---|---|
| 8,306,548 B2 | 11/2012 | Yuhara et al. |
| 2001/0016918 A1 | 8/2001 | Alexander et al. |
| 2010/0198955 A1 | 8/2010 | Maruyama et al. |
| 2012/0191992 A1 | 7/2012 | Fujishima |
| 2015/0381475 A1* | 12/2015 | Yamamoto ............ H04W 24/08 370/216 |
| 2021/0253047 A1* | 8/2021 | Okada .................. H04L 12/403 |

* cited by examiner

COMMUNICATION DEVICE AND CONTROL METHOD

CROSS-REFERENCE TO RELATED APPLICATIONS

This application is the U.S. national stage of PCT/JP2019/020912 filed on May 27, 2019, which claims priority of Japanese Patent Application No. JP 2018-110551 filed on Jun. 8, 2018 and Japanese Patent Application No. JP 2018-230275 filed on Dec. 7, 2018, the contents of which are incorporated herein.

TECHNICAL FIELD

The present disclosure relates to a communication device that includes a plurality of processing units and a method for controlling these processing units.

BACKGROUND

Conventionally, devices such as a plurality of ECUs (Electronic Control Units) mounted in vehicles perform communication in compliance with communication standards such as CAN (Controller Area Network) or Ethernet (registered trademark). The plurality of ECUs exchange information through communication and perform control of the vehicle and the like in tandem. Also, in recent years, the number of ECUs mounted in a vehicle has increased, and a configuration has been adopted in which a plurality of network groups are provided in the vehicle and communications between the groups are relayed by a device such as a gateway.

JP 5030063B discloses a navigation device that determines a communication parameter in accordance with a communication condition or a communication state. This navigation device transmits a message to a server device, and receives a response message to this message from the server device. Based on a time from when the message is transmitted to when the response message is received, the navigation device measures a response value that indicates a communication state regarding a communication time. The navigation device determines an optimal communication parameter based on the measured response value, and sets the optimal communication parameter to a communication parameter regarding a communication disconnection condition.

It is conceivable that communication devices such as an ECU or a gateway include a plurality of processing units such as microcomputers that execute programs and perform processing. If a plurality of processing units being provided, for example, it can be expected that processing loads will be distributed. However, if there is an abnormality such as a malfunction in one processing unit, there is the problem that such an abnormality may adversely affect operations of other processing units.

The present disclosure has been made in view of these circumstances, and an object of the present disclosure is to provide a communication device and a control method, according to which, in particular in a configuration in which a plurality of processing units having a master-subordinate relationship therebetween, processing for controlling an abnormality and the like that has occurred in the subordinate processing unit can be performed by the master processing unit.

SUMMARY

A communication device according to an aspect includes a master processing unit, and a subordinate processing unit, and the subordinate processing unit performs processing regarding communication, the master processing unit controls activation of the subordinate processing unit, the subordinate processing unit periodically transmits a signal to the master processing unit, and the master processing unit controls an operation of the subordinate processing unit in accordance with the signal that is periodically transmitted by the subordinate processing unit.

A control method according to an aspect is performed in a communication device that includes a subordinate processing unit that performs processing regarding communication and a master processing unit that controls activation of the subordinate processing unit, the method including the subordinate processing unit periodically transmitting a signal to the master processing unit, and the master processing unit controlling an operation of the subordinate processing unit in accordance with a signal that is periodically transmitted from the subordinate processing unit.

Note that this application can be realized not only as a communication device including such characteristic processing units, but also as a control method which includes such characteristic processing as steps, a computer program for causing a computer to execute the steps, and the like. This application can also be realized as a semiconductor integrated circuit that realizes a portion or all of the communication device, and another device or a system including the communication device.

First, aspects of implementation of the present disclosure will be listed and described. At least some of the following embodiments may also be combined as desired.

A communication system according to one aspect includes a master processing unit, and a subordinate processing unit, and the subordinate processing unit performs processing regarding communication, the master processing unit controls activation of the subordinate processing unit, the subordinate processing unit periodically transmits a signal to the master processing unit, and the master processing unit controls an operation of the subordinate processing unit in accordance with the signal that is periodically transmitted by the subordinate processing unit.

In this aspect, the communication device includes two processing units, namely, the master processing unit and the subordinate processing unit. The master processing unit controls activation of the subordinate processing unit. The subordinate processing unit performs processing regarding communication. The subordinate processing unit also periodically transmits a predetermined signal to the master processing unit. The master processing unit controls the operations of the subordinate processing unit in accordance with the signal that is periodically transmitted by the subordinate processing unit.

Accordingly, the master processing unit can grasp the operation state and the like of the subordinate processing unit based on the signal that is periodically transmitted from the subordinate processing unit.

It is preferable that the master processing unit subjects the subordinate processing unit to a predetermined control if the master processing unit does not receive the signal for a predetermined time period.

In this aspect, when the master processing unit does not receive the signal that is periodically transmitted from the subordinate processing unit for a predetermined time period, the master processing unit subjects the subordinate processing unit to a predetermined control. When a state in which the periodic signal is not received from the subordinate processing unit continues for a predetermined time period, it can be inferred that an abnormality has occurred in the subordinate processing unit. In this case, by the master processing unit performing predetermined control, it is possible to handle the abnormality in the subordinate processing unit.

It is preferable that the master processing unit performs control for reactivating or stopping the subordinate processing unit as the predetermined control.

In this aspect, the predetermined control performed by the master processing unit when the periodic signal is not received from the subordinate processing unit is control for reactivating or stopping the subordinate processing unit. By control for reactivating being performed, the subordinate processing unit, in which an abnormality has occurred, may return to a normal state. Also, by control for stopping being performed, it is possible to avoid a case that the abnormality in the subordinate processing unit adversely affects the master processing unit and other devices and the like.

It is preferable that the subordinate processing unit selectively executes a plurality of programs that are stored in a storage unit, the master processing unit gives a selection instruction as to which of the programs is to be executed by the subordinate processing unit, and a signal that is periodically transmitted by the subordinate processing unit includes information indicating which of the programs is being executed.

In this aspect, the subordinate processing unit selectively executes one of the plurality of programs stored in the storage unit. The program to be executed by the subordinate processing unit is selected according to the selection instruction by the master processing unit. When transmitting the periodic signal, the subordinate processing unit includes, in the signal, information indicating the program being executed. In this manner, upon receiving the periodic signal, the master processing unit can grasp the program being executed by the subordinate processing unit, and grasp whether the program which was designated by the master processing unit is executed.

It is preferable that the master processing unit performs processing for updating a program to be executed by the subordinate processing unit, and the plurality of programs include a pre-update program and a post-update program.

In this aspect, there are cases in which it is necessary to update programs to be executed by the subordinate processing unit for the purpose of version upgrade, fixing defects, or the like, and the master processing unit performs processing for updating programs to be executed by the subordinate processing unit. In update processing, the master processing unit stores a new program in the storage unit of the subordinate processing unit. The storage unit of the subordinate processing unit for storing programs can store a plurality of programs, and can store the pre-update program and post-update program. After completing storage of the post-update program, the master processing unit gives the subordinate processing unit the selective instruction to read out and execute the post-update program from the storage unit, and accordingly the subordinate processing unit can execute the post-update program stored in the storage unit.

It is preferable that the signal that is periodically transmitted by the subordinate processing unit includes information regarding an error that has occurred in processing performed by the subordinate processing unit.

In this aspect, the subordinate processing unit includes the information regarding the error that has occurred in processing performed by the subordinate processing unit in the periodic signal when transmitting the signal. Accordingly, upon receiving the periodic signal, the master processing unit can grasp the error that has occurred in the subordinate processing unit, and perform processing such as restoration from the error.

It is preferable that the information regarding the error is information regarding an abnormality in a voltage that is supplied to the subordinate processing unit.

In this aspect, since an abnormality in the voltage supplied to the subordinate processing unit can be grasped, it is possible to prevent the operational malfunction of the subordinate processing unit due to being supplied with the voltage higher or lower than the voltage range regarding predetermined operations in the subordinate processing unit.

It is preferable that the abnormality in the voltage is that a value of the voltage drops to less than a predetermined value.

In this aspect, since an abnormality in the voltage supplied to the subordinate processing unit can be grasped, it is possible to prevent the operational malfunction of the subordinate processing unit due to being supplied with the voltage lower than the voltage range predetermined in the subordinate processing unit that is caused by a drop of the voltage supplied from the battery.

A control method according to an aspect is performed in a communication device that includes a subordinate processing unit that performs processing regarding communication and a master processing unit that controls activation of the subordinate processing unit, the method including the subordinate processing unit periodically transmitting a signal to the master processing unit, and the master processing unit controlling an operation of the subordinate processing unit in accordance with a signal that is periodically transmitted from the subordinate processing unit.

In this aspect, similarly to the aspect (1), the master processing unit can grasp the operation state and the like of the subordinate processing unit based on the signal periodically transmitted from the subordinate processing unit.

ADVANTAGEOUS EFFECTS OF PRESENT DISCLOSURE

According to the above, the master processing unit can perform processing for controlling an abnormality and the like that has occurred in a subordinate processing unit.

DETAILED DESCRIPTION OF PREFERRED EMBODIMENTS

The following will describe specific examples of communication device according to embodiments of the present disclosure with reference to the drawings. Note that the present disclosure is not limited to these examples, but is defined by the claims, and is intended to encompass all modifications within the meanings and scope that are equivalent to the claims.

First Embodiment

Figure 1:
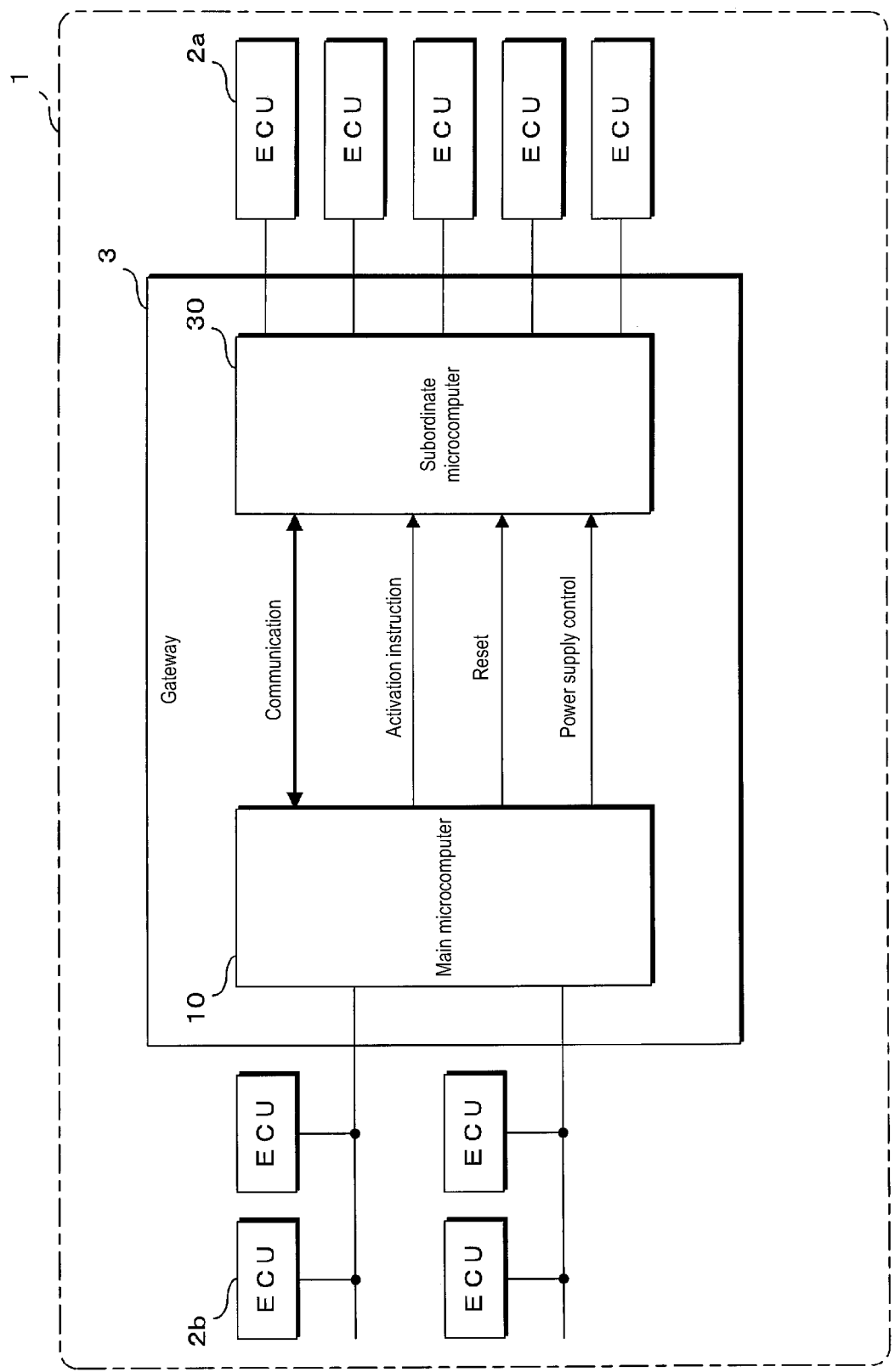
FIG. 1 is a block diagram showing a configuration of a gateway according to a first embodiment.

FIG. 1 is a block diagram showing a configuration of a gateway according to a first embodiment. A gateway 3 according to the first embodiment is mounted in a vehicle 1. A plurality of ECUs 2a and 2b are mounted in the vehicle 1, and the plurality of ECUs 2a and 2b can perform communication in compliance with the communication standard of CAN or Ethernet. The gateway is a communication device that performs processing for relaying transmission/reception of messages between these plurality of ECUs 2a and 2b. In the first embodiment, the ECU 2a performs communication in compliance with the Ethernet communication standard, and the ECU 2b performs communication in compliance with the CAN communication standard. The gateway 3 is connected to the ECU 2a via the Ethernet communication lines, and is also connected to the ECU 2b via the CAN communication lines (CAN bus).

The gateway 3 includes two microcomputers, namely, a master microcomputer 10 and a subordinate microcomputer 30. A microcomputer is configured by including, for example, a processor, a memory, a communication unit, and the like as one IC (Integrated Circuit), and various kinds of computation processing, control processing and the like can be performed by executing pre-stored programs. In the gateway 3 according to the first embodiment, for example, the master microcomputer 10 and the subordinate microcomputer 30 are mounted on one circuit board, and signals are exchanged via wiring formed on the circuit board. Also, a plurality of connectors for connecting the Ethernet and CAN communication lines are mounted on the circuit board, and the connectors and the master microcomputer 10 or the subordinate microcomputer 30 are connected to each other via the wiring on the circuit board. By the connectors being connected to the communication lines, the master microcomputer 10 and the subordinate microcomputer 30 can perform communication with the ECUs 2a and 2b via the communication lines.

In the gateway 3 according to the first embodiment, the master microcomputer 10 performs CAN communication, and the subordinate microcomputer 30 performs Ethernet communication. However, this role allotment is just one example, and there is no limitation to this. The master microcomputer 10 is connected to the plurality of the CAN communication lines, and the communication lines are connected to the plurality of ECUs 2b. The master microcomputer 10 performs processing for relaying transmission/reception of messages between the communication lines. Similarly, the subordinate microcomputer 30 is connected to the plurality of the Ethernet communication lines, and the communication lines are connected to the ECUs 2a. The subordinate microcomputer 30 performs processing for relaying transmission/reception of messages between the ECUs 2a. The gateway 3 can also relay transmission/reception of messages between the ECUs 2a and the ECUs 2b, and in this case, messages are exchanged between the master microcomputer 10 and the subordinate microcomputer 30.

The master microcomputer 10 and the subordinate microcomputer 30 can perform transmission/reception of messages through communication (see the bold arrow with the label "communication" in FIG. 1). Furthermore, in order to control the operations of the subordinate microcomputer 30, the master microcomputer 10 outputs an activation instruction signal, a reset signal, and a power supply control signal to the subordinate microcomputer 30 (see the thin arrows with the labels "activation instruction", "reset", and "power supply control") in FIG. 1). These communication lines and signal lines are realized as wiring on the circuit board on which the master microcomputer 10 and the subordinate microcomputer 30 are mounted.

The MII (Media Independent Interface) communication standard may be adopted in communication performed between the master microcomputer 10 and the subordinate microcomputer 30, for example. In this case, the communication lines for transmitting messages from the master microcomputer 10 to the subordinate microcomputer 30, the communication lines for transmitting messages from the subordinate microcomputer 30 to the master microcomputer 10, and the signal lines for performing control regarding communication. The master microcomputer 10 and the subordinate microcomputer 30 can exchange messages to be relayed from the ECUs 2a to the ECUs 2b, or from the ECUs 2b to the ECUs 2a through this communication, for example.

The activation instruction signal that is output from the master microcomputer 10 is a signal for instructing selection of a program that is to be read out from the memory and executed by the subordinate microcomputer 30 at the time of activation. Although details will be described later, the memory of the subordinate microcomputer 30 stores two programs, and the subordinate microcomputer 30 reads out and executes one of the two programs at the time of activation. When the two programs are a program A and a program B, for example, if the activation instruction signal that is output from the master microcomputer 10 is at a low level, the subordinate microcomputer 30 may execute the program A, and if the signal is at a high level, the subordinate microcomputer 30 may execute the program B. In the first embodiment, the signal line for transmission/reception of the activation signal may be one line. However, if the subordinate microcomputer 30 can store three or more programs or the subordinate microcomputer 30 can further designate the operation mode and the like of the programs, a plurality of signal lines for transmission/reception of the activation signal may also be provided.

The reset signal that is output from the master microcomputer 10 is a signal for resetting (initializing) the operations of the subordinate microcomputer 30. If the reset signal is at the low level, the subordinate microcomputer 30 is reset, for example, and thereafter, by the reset signal changing to the high level, the reset is cancelled, and the operations of the subordinate microcomputer 30 are started. At this time, the subordinate microcomputer 30 starts the operations by reading out and executing the program that has been designated by the activation signal.

In addition, the power supply control signal that is output from the master microcomputer 10 is a signal for turning ON/OFF the power source (power supply) of the subordinate microcomputer 30. If the power supply control signal is at the low level, for example, the subordinate microcomputer 30 is turned OFF and stopped. If the power supply control signal is at the high level, the subordinate microcomputer 30 is turned ON and operates.

In the gateway 3 according to the first embodiment, the subordinate microcomputer 30 transmits a predetermined message at a cycle of once a second, for example. This periodic transmission of the message is transmission of a message for giving notice, to the master microcomputer 10, that the subordinate microcomputer 30 is operating normally, and corresponds to transmission of a signal that may be called "Keep Alive". In the first embodiment, this message is called a "periodic message". The master microcomputer 10 receives the periodic message from the subordinate microcomputer 30 at a cycle of once a second. If this periodic message cannot be received, the master microcomputer 10 determines that an abnormality has occurred in the subordinate microcomputer 30, and performs control such as resetting the subordinate microcomputer 30, turning the power OFF, or the like. Note that in the first embodiment, the periodic message is transmitted from the subordinate microcomputer 30 to the master microcomputer 10 at the cycle of once a second, the cycle is an example and there is no limitation to this. The cycle may also be once every 100 milliseconds or once every 10 seconds, for example. Not that it is preferable that the transmission cycle of the periodic message is sufficiently long compared to the cycle, frequency or the like of communication for relaying messages between the ECUs 2a and 2b.

Also, in the gateway 3 according to the first embodiment, if it is necessary to update a program to be executed by the subordinate microcomputer 30 for the purpose of version upgrading or fixing defects, the master microcomputer 10 performs processing for updating the program in the subordinate microcomputer 30. The master microcomputer 10 obtains an update program from a server device or the like that is located outside of the vehicle 1, for example. Although the path for obtaining the update program is not shown in FIG. 1, the master microcomputer 10 may perform communication with a server device that is located outside of the vehicle 1 by using a wireless communication device mounted in the vehicle 1 to obtain the update program, for example. The master microcomputer 10 transmits the obtained update program to the subordinate microcomputer 30 through MII communication.

The subordinate microcomputer 30 can store the two programs in the memory as described above. Upon receiving the update program from the master microcomputer 10, the subordinate microcomputer 30 overwrites a region, in which programs which are not executed at the time are stored, with the received update program to store the update program. After completing transmission of the update program, the master microcomputer 10 outputs the activation instruction signal for executing the update program stored in the memory, and resets the subordinate microcomputer 30. Accordingly, the subordinate microcomputer 30 can read out and execute the new program (update program) stored in the memory, and the update processing of the program in the subordinate microcomputer 30 is complete.

Also, the subordinate microcomputer 30 transmits, to the master microcomputer 10, the periodic message including information indicating which of the two programs stored in the memory is being executed at a cycle of once a second. Upon receiving the periodic message, the master microcomputer 10 can grasp which program is executed by the subordinate microcomputer 30 and confirm if the program designated by the master microcomputer 10 in the activation instruction is being executed, based on the information included in the periodic message.

When an error has occurred in processing or the like performed by the subordinate microcomputer 30, the subordinate microcomputer 30 transmits the periodic message including information regarding the error. Upon receiving the periodic message, the master microcomputer 10 can perform control processing such as resetting or stopping the subordinate microcomputer 30 based on the information regarding to the error included in the periodic message. The master microcomputer 10 can grasp the situation in which the subordinate microcomputer 30 can transmit the periodic message but an error has occurred.

Figure 2:
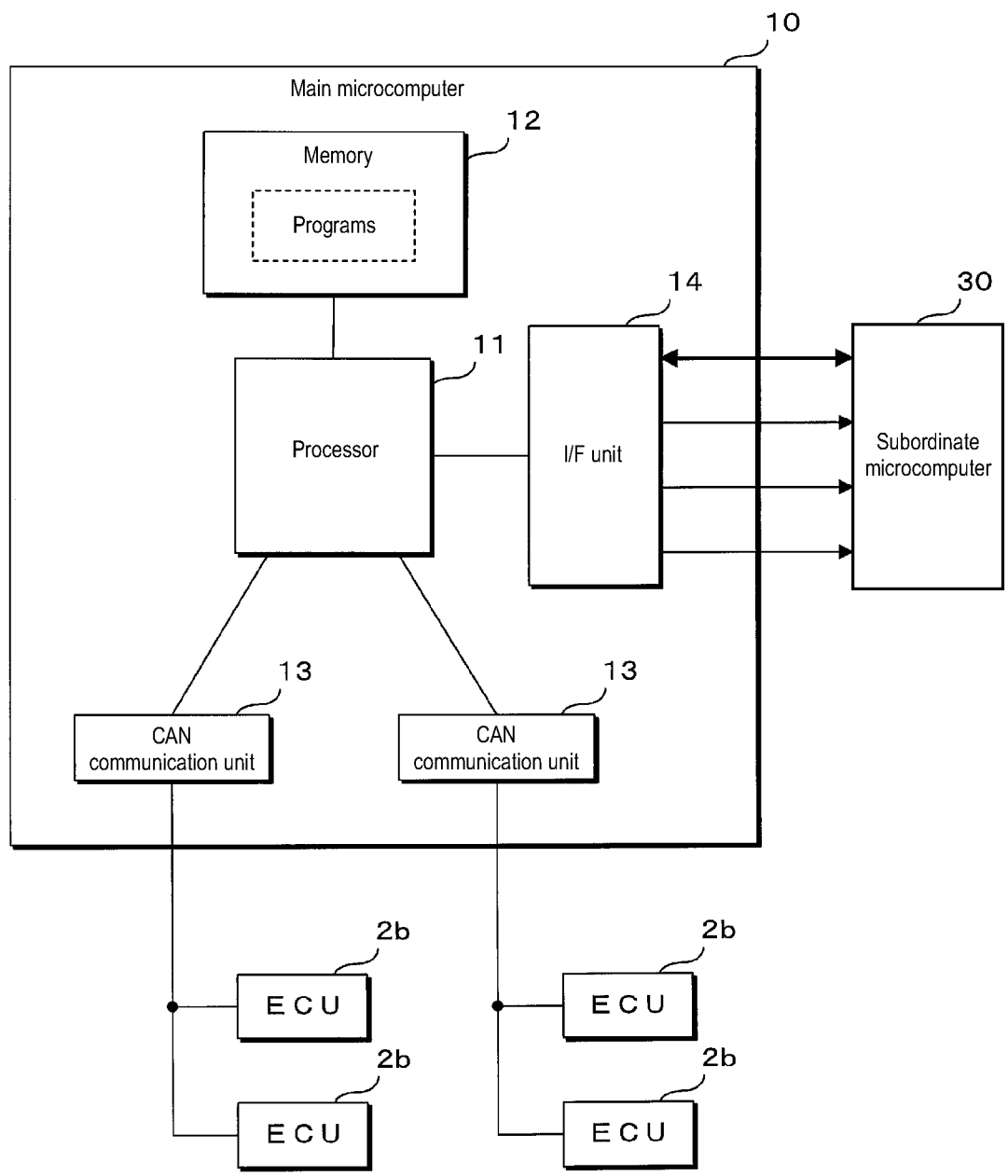
FIG. 2 is a block diagram showing a configuration of a master microcomputer according to the first embodiment.

FIG. 2 is a block diagram showing a configuration of the master microcomputer 10 according to the first embodiment. The master microcomputer 10 according to the first embodiment includes a processor 11, a memory 12, a CAN communication unit 13, an I/F (interface) unit 14, and the like. The processor 11 is a computation processing device that performs various kinds of computation processing by reading out and executing programs stored in the memory 12. The memory 12 is constituted by using a non-volatile memory device such as an EEPROM (Electrically Erasable Programmable Read Only Memory) or a flash memory, and stores various kinds of programs executed by the processor 11, data required to execute the programs and the like.

The CAN communication units 13 perform transmission/reception of messages in compliance with the CAN communication standard. The master microcomputer 10 according to the first embodiment includes the two CAN communication units 13. The two CAN communication units 13 are connected to the communication lines, and perform transmission/reception of messages with the ECUs 2b connected to the communication lines. The CAN communication units 13 transmit the message supplied from the processor 11 to the ECUs 2b via the communication lines. Also, the CAN communication units 13 supply, to the processor 11, the message received from the ECUs 2b via the communication lines.

An I/F unit 14 performs communication, signal exchange, and the like with the subordinate microcomputer 30. The I/F unit 14 is connected to the subordinate microcomputer 30 via the plurality of wirings mounted on the circuit board of the gateway 3. The I/F unit 14 performs transmission/reception of messages with the subordinate microcomputer 30 in compliance with the MII communication standard. The I/F unit 14 transmits messages supplied from the processor 11 to the subordinate microcomputer 30, and receives messages from the subordinate microcomputer 30 and supplies the received messages to the processor 11. The I/F unit 14 also outputs, to the subordinate microcomputer 30, the signals of activation instruction, reset, and power supply control, in accordance with the control performed by the processor 11.

Figure 3:
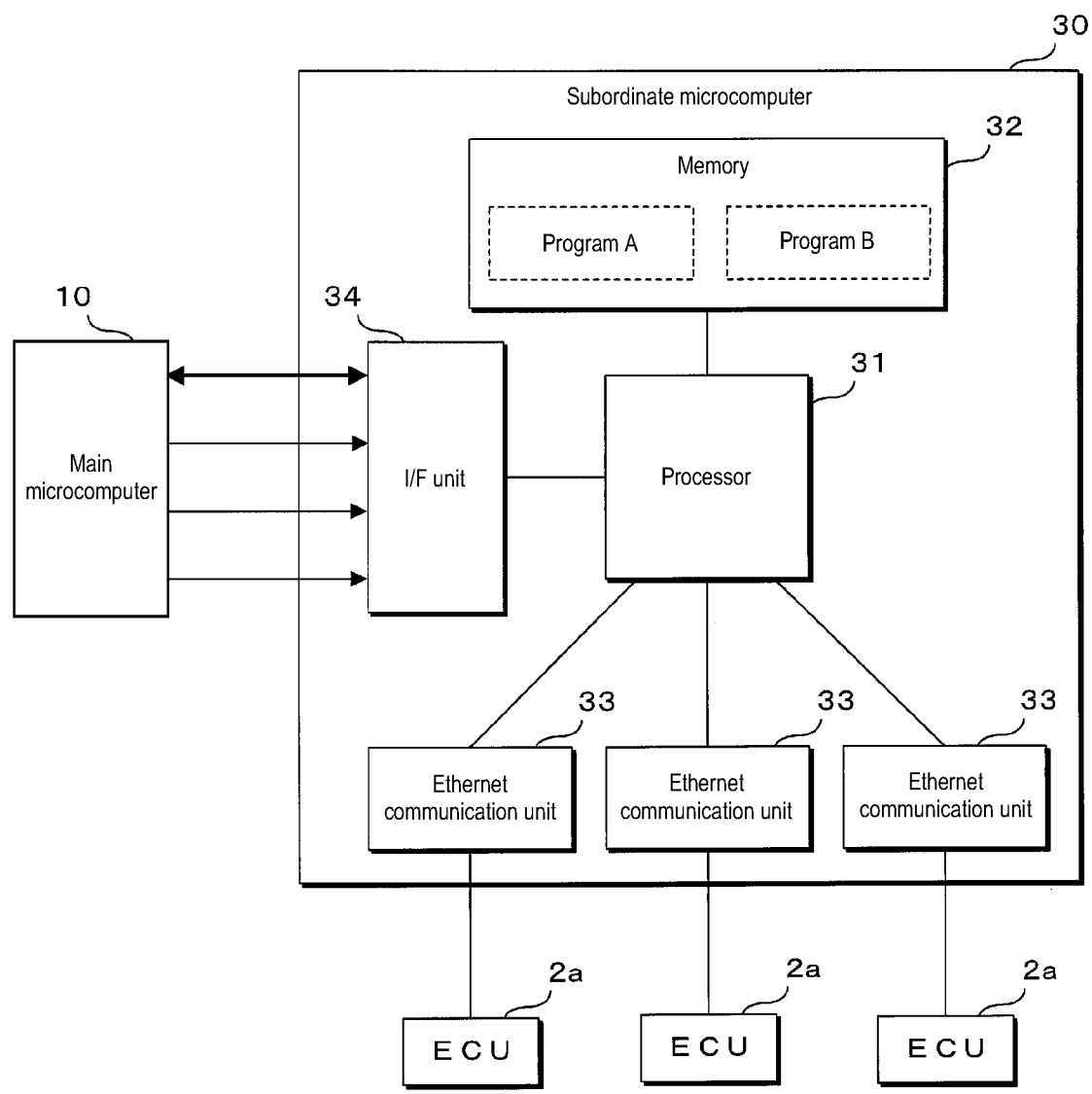
FIG. 3 is a block diagram showing a configuration of a subordinate microcomputer according to the first embodiment.

FIG. 3 is a block diagram showing a configuration of the subordinate microcomputer 30 according to the first embodiment. The subordinate microcomputer 30 according to the first embodiment includes a processor 31, a memory 32, Ethernet communication units 33, an I/F unit 34, and the like. The processor 31 is a computation processing device that performs various kinds of computation processing by reading out and executing programs stored in the memory 32.

The memory 32 is constituted by using a non-volatile memory device such as an EEPROM (Electrically Erasable Programmable Read Only Memory) or a flash memory, and stores various kinds of programs executed by the processor 31, data required to execute the programs and the like. In the first embodiment, the memory 32 can store the two programs executed by the processor 31 (In FIG. 3, they are indicated as the program A and the program B). The processor 31 reads out and executes one of the programs from the memory 32 in accordance with the activation signal supplied from the master microcomputer 10.

The Ethernet communication units 33 perform transmission/reception of messages in compliance with the Ethernet communication standard. Note that although the subordinate microcomputer 30 includes the plurality of Ethernet communication units 33 in the first embodiment, the configuration is simplified and only three Ethernet communication units 33 are shown in FIG. 3. The communication lines are connected to the plurality of Ethernet communication units 33, and the Ethernet communication units 33 perform transmission/reception of messages with the ECUs 2a connected to the communication lines. The Ethernet communication units 33 transmit messages supplied from the processor 31 to the ECUs 2a via the communication lines. The Ethernet communication units 33 also supply the messages received from the ECUs 2a to the processor 31 via the communication lines.

The I/F unit 34 performs communication, signal exchange, and the like with the master microcomputer 10. The I/F unit 34 is connected to the master microcomputer 10 via the plurality of wirings mounted on the circuit board of the gateway 3. The I/F unit 34 performs transmission/reception of messages with the master microcomputer 10 in compliance with the MII communication standard. The I/F unit 34 transmits messages supplied from the processor 31 to the master microcomputer 10, and receives messages from the master microcomputer 10 and supplies the received messages to the processor 31. The I/F unit 34 also obtains the state of the signals (whether it is at a high level or a low level) of activation instruction, reset, and power supply control that are output from the master microcomputer 10, and supplies the obtained state of the signals to the processor 31.

Figure 4:
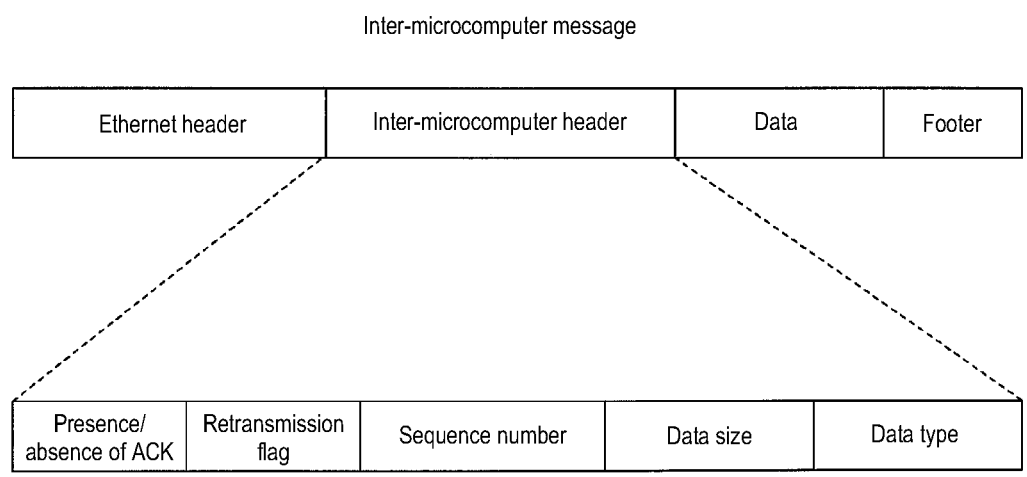
FIG. 4 is a schematic diagram showing a configuration of a message that is transmitted/received between the master microcomputer and the subordinate microcomputer.

FIG. 4 is a schematic diagram showing the configuration of a message that is transmitted/received between the master microcomputer 10 and the subordinate microcomputer 30. A message transmitted/received between the master microcomputer 10 and the subordinate microcomputer 30 includes Ethernet header, inter-microcomputer communication header, data, footer, and the like. Note that the message configuration shown in FIG. 4 is a configuration that is common in the messages that are usually transmitted/received by the master microcomputer 10 and the subordinate microcomputer 30 and the periodic messages that are transmitted from the subordinate microcomputer 30 to the master microcomputer 10.

A message transmitted/received between the master microcomputer 10 and the subordinate microcomputer 30 is compliant with the Ethernet MII communication standard, and the Ethernet header included in the message includes information in compliance with this communication standard such as the address of the transmission/reception source and the message type. The inter-microcomputer communication header included in the message is information unique to the first embodiment, and includes information such as presence/absence of ACK, retransmission flag, a sequence number, data size, data type, and the like. The data is an appropriate data to be transmitted/received between the master microcomputer 10 and the subordinate microcomputer 30. The footer is predetermined data indicating the end of the message.

Information regarding the presence/absence of ACK in the inter-microcomputer communication header is information indicating whether it is necessary to send an ACK, that is, a response notifying the reception of the message. The retransmission flag is a flag indicating that the message is transmitted for the second or further time. The sequence number is for setting a number for identifying the message between the master microcomputer 10 and the subordinate microcomputer 30. The data size is for setting the size of data subsequent to the inter-microcomputer communication header. The data type is for setting the type of the message. The periodic message transmitted from the subordinate microcomputer 30 to the master microcomputer 10 is distinguished by setting information indicating that the message is a periodic message to the data type of the inter-microcomputer communication header.

As described above, the periodic message data includes information indicating which is the program being executed by the processor 31 of the subordinate microcomputer 30, of the two programs stored in the memory 32. Furthermore, if an error has occurred in the subordinate microcomputer 30, information regarding this error is included in the data of the periodic message. Examples of errors that occur in the subordinate microcomputer 30 may include a register setting error of the subordinate microcomputer 30, a memory 32 read-write error, and an Ethernet communication error. In the periodic message data, information indicating the presence/absence of an error and the error type may be set as information regarding the error.

Figure 5:
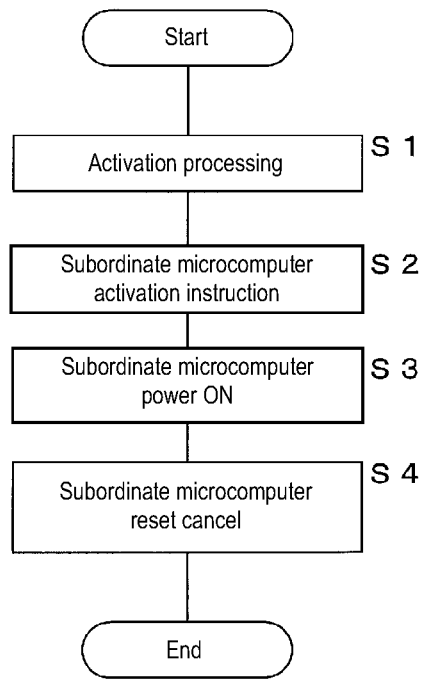
FIG. 5 is a flowchart of a procedure of processing performed by the master microcomputer according to the first embodiment at the time of activation.

FIG. 5 is a flowchart showing a procedure of processing performed by the master microcomputer 10 according to the first embodiment at the time of activation. The processor 11 of the master microcomputer 10 according to the first embodiment reads out the program from the memory 12 and executes the program, for example, when the power supply to the gateway 3 is started and the power-on reset and the like are cancelled, and performs its activation processing such as setting initial values required for processing (step S1). Upon completing the activation processing, the processor 11 determines the program to be executed by the subordinate microcomputer 30 and outputs the activation instruction signal based on this determination (step S2). The master microcomputer 10 stores, in the memory 32, which of the program A or the program B is the latest program in the subordinate microcomputer 30, for example, and in step S2, the processor 11 can determine which program is to be executed based on the stored information.

Next, the processor 11 switches the power supply control signal transmitted to the subordinate microcomputer 30 from the low level to the high level, thereby turning ON the power supply of the subordinate microcomputer 30 (step S3). Thereafter, the processor 11 switches the reset signal to be sent to the subordinate microcomputer 30 from the low level to the high level, thereby cancelling the reset of the subordinate microcomputer 30 (step S4), and ends the activation processing.

Figure 6:
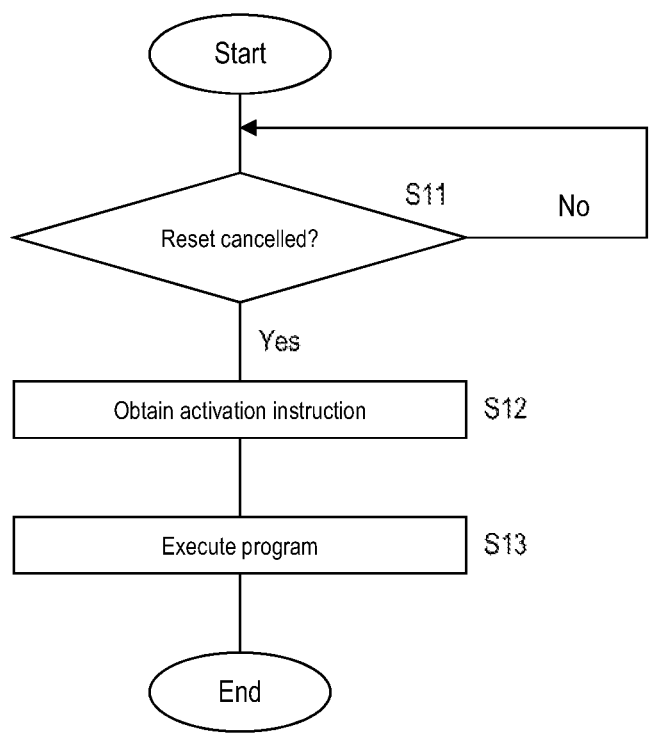
FIG. 6 is a flowchart of a procedure of processing performed by the subordinate microcomputer according to the first embodiment activation.

FIG. 6 is a flowchart showing a procedure of processing performed by the subordinate microcomputer 30 according to the first embodiment at the time of activation. The subordinate microcomputer 30 according to the first embodiment starts processing in accordance with the control for turning ON the power supply performed by the master microcomputer 10. The processor 31 of the subordinate microcomputer 30 determines whether the reset has been cancelled based on the reset signal from the master microcomputer 10 (step S11). If the reset has not been cancelled (S11: NO), the processor 31 stands by until the reset is cancelled.

If the reset is cancelled (S11: YES), the processor 31 obtains the activation instruction based on the signal that is input from the master microcomputer 10 (step S12). The processor 31 reads out and executes the program designated by the obtained activation instruction from the memory 32 (step S13), and ends the processing at the time of activation.

Figure 7:
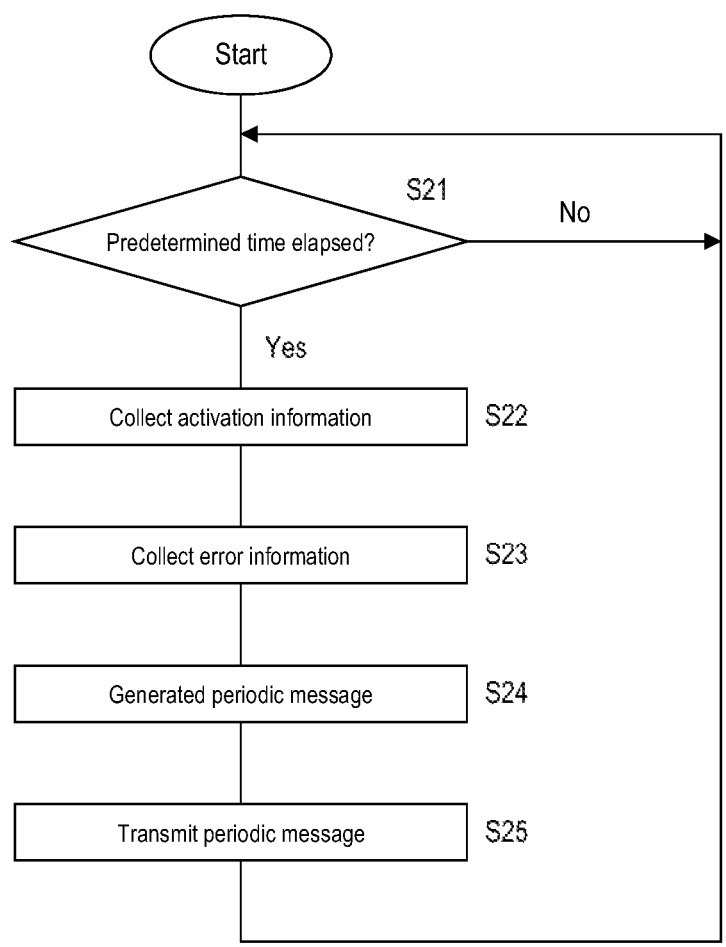
FIG. 7 is a flowchart of a procedure of processing for transmitting a periodic message performed by the subordinate microcomputer according to the first embodiment.

FIG. 7 is a flowchart showing a procedure of processing for transmitting a periodic message performed by the subordinate microcomputer 30 according to the first embodiment. The processor 31 of the subordinate microcomputer 30 according to the first embodiment includes a timer function and the like, and determines whether a predetermined time period has elapsed from the activation or the previous transmission of the periodic message (step S21). If a predetermined time period has not elapsed (S21: NO), the processor 31 stands by until the predetermined time period has elapsed.

If a predetermined time period has elapsed (S21: YES), the processor 31 collects activation information indicating whether the program being executed at the time is the program A or the program B stored in the memory 32 (step S22). The processor 31 also collects error information indicating whether an error has occurred in its processing, and if an error has occurred, the type of the error and the like (step S23). The processor 31 generates the periodic message including the collected activation information or the error information in the data (step S24). The processor 31 supplies the generated periodic message to the I/F unit 34 thereby transmitting the periodic message to the master microcomputer 10 (step S25), and returns the processing to step S21.

Figure 8:
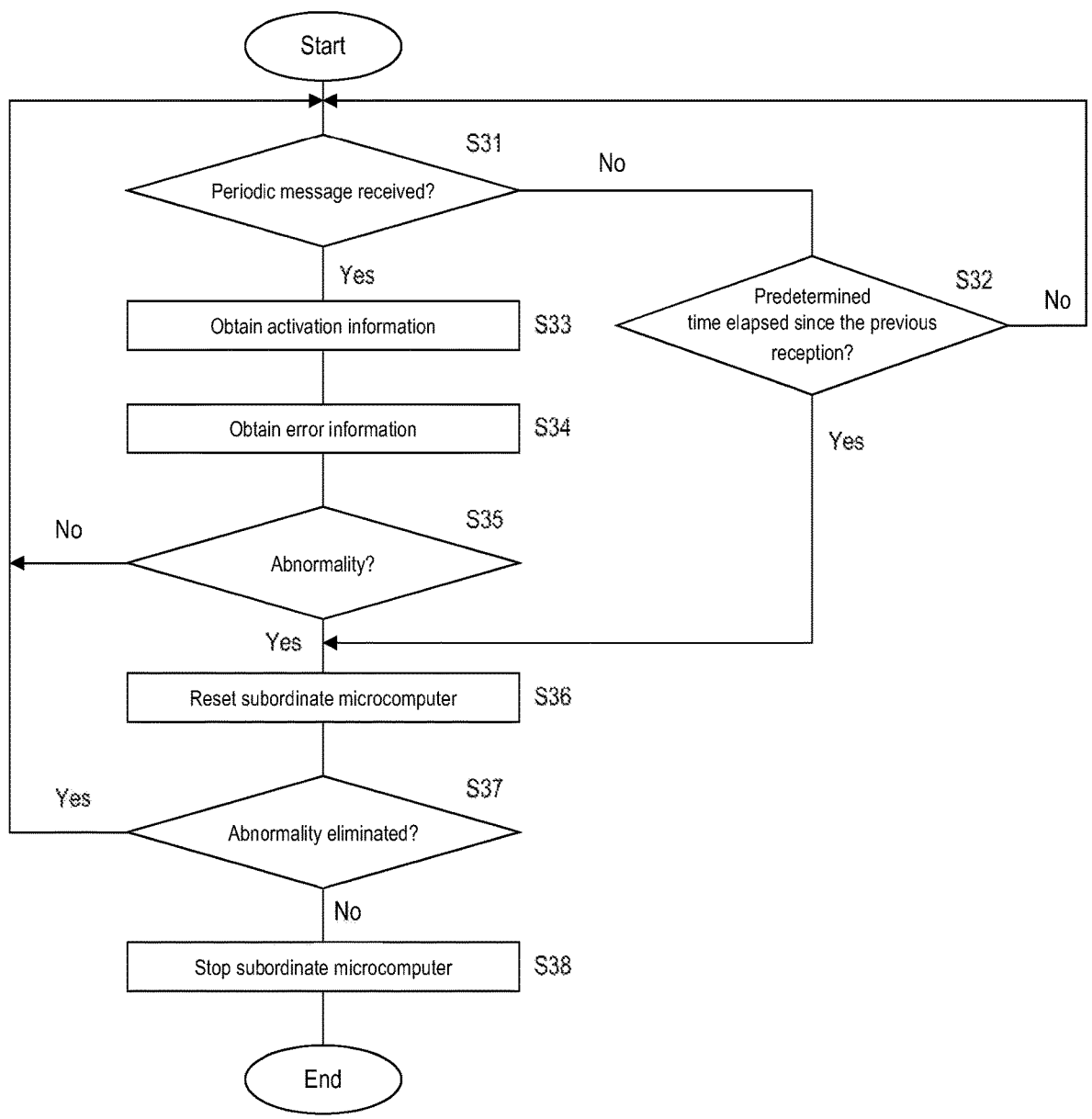
FIG. 8 is a flowchart of a procedure of control processing performed by the master microcomputer according to the first embodiment based on the periodic message.

FIG. 8 is a flowchart showing a procedure of control processing based on the periodic message, performed by the master microcomputer 10 according to the first embodiment. The processor 11 of the master microcomputer 10 according to the first embodiment determines whether the I/F unit 14 has received the periodic message from the subordinate microcomputer 30 (step S31). If the periodic message has not been received (S31: NO), the processor 11 determines whether a predetermined time period or more has elapsed from the previous reception of the periodic message (step S32). The predetermined time period used in this determination may be one second, that is, the transmission cycle of the periodic message, or a time period longer than the transmission cycle (e.g., three seconds). If the predetermined time period or more has not elapsed (S32: NO), the processor 11 returns the processing to step S31, and stands by until the processor 11 receives the periodic message, or the predetermined time period or more elapses from the previous reception.

If the periodic message is received (S31: YES), the processor 11 obtains the activation information included in the data of the periodic message (step S33). Also, if an error information is included in the data of the received periodic message, the processor 11 obtains the error information (step S34). The processor 11 determines whether there is an abnormality in the subordinate microcomputer 30 based on the obtained activation information and the error information (step S35). Here, the processor 11 can determine that there is an abnormality in the subordinate microcomputer 30 if there is a discrepancy between the obtained activation information and the activation instruction that was output by the processor 11. Furthermore, the processor 11 can determine that there is an abnormality in the subordinate microcomputer 30 if error information is included in the periodic message. If there is no abnormality in the subordinate microcomputer 30 (S35: NO), the processor 11 returns the processing to step S31.

If there is an abnormality in the subordinate microcomputer 30 (S35: YES), the processor 11 advances the processing to step S36. Also, if a predetermined time period or more has elapsed since the reception of the previous periodic message (S32: YES), the processor 11 determines that there is an abnormality in the subordinate microcomputer 30, and advances the processing to step S36. The processor 11 switches the reset signal that is output from the I/F unit 14 from the high level to the low level, thereby resetting the subordinate microcomputer 30 (step S36). Thereafter, the processor 11 cancels the reset and reactivates the subordinate microcomputer 30, and determines whether the abnormality in the subordinate microcomputer 30 has been eliminated based on whether the periodic message has been received from the reactivated subordinate microcomputer 30 and the content of the message (step S37). If the abnormality has been eliminated (S37: YES), the processor 11 returns the processing to step S31. If the abnormality has not been eliminated (S37: NO), the processor 11 switches the power supply control signal that is output from the I/F unit 14 from the high level to the low level, thereby turning OFF the subordinate microcomputer 30 (step S38), and ends the processing.

The gateway 3 according to the first embodiment configured as above includes the two microcomputers, namely, the master microcomputer 10 and the subordinate microcomputer 30. The master microcomputer 10 controls activation of the subordinate microcomputer 30. The master microcomputer 10 performs CAN-related communication processing, and the subordinate microcomputer 30 performs Ethernet-related communication processing. Also, the subordinate microcomputer 30 transmits, to the master microcomputer 10, the periodic message (a predetermined signal) in a cycle of once a second, for example. The master microcomputer 10 controls the operations of the subordinate microcomputer 30 in accordance with the periodic message from the subordinate microcomputer 30. Accordingly, the master microcomputer 10 can grasp the operation state and the like of the subordinate microcomputer 30 based on the periodic message from the subordinate microcomputer 30.

Also, if the master microcomputer 10 of the gateway 3 has not received the periodic message from the subordinate microcomputer 30 for a predetermined time period, the master microcomputer 10 subjects the subordinate microcomputer 30 to a predetermined control. If the state in which the periodic message from the subordinate microcomputer 30 is not received for a predetermined time period, it is possible to infer that an abnormality has occurred in the subordinate microcomputer 30. In this case, by the master microcomputer 10 performing a predetermined control, it is possible to handle the abnormality in the subordinate microcomputer 30.

Furthermore, the master microcomputer 10 performs control for reactivating (resetting) or stopping (turn OFF the power of) the subordinate microcomputer 30 as a predetermined control performed when the periodic message is not received from the subordinate microcomputer 30 for a predetermined time period. By performing control for reactivating, the subordinate microcomputer 30, in which an abnormality has occurred, may return to the normal state. Also, by performing control for stopping, it is possible to avoid a case in which the abnormality in the subordinate microcomputer 30 adversely affects the master microcomputer 10, the ECUs 2a, and the like.

Furthermore, in the subordinate microcomputer 30 of the gateway 3, the processor 31 selects and executes one of the two programs stored in the memory 32. The program that is to be executed by the processor 31 of the subordinate microcomputer 30 is selected in accordance with the selection instruction (activation instruction) from the master microcomputer 10. The subordinate microcomputer 30 transmits, to the master microcomputer 10, the periodic message including information indicating the program being executed by the processor 31. Accordingly, upon receiving the periodic message, the master microcomputer 10 can grasp the program being executed by the subordinate microcomputer 30 and whether the program designated by the master microcomputer 10 is being executed.

Also, the program executed by the processor 31 of the subordinate microcomputer 30 may need to be updated for the purpose of version upgrading, fixing defects, and the like, and processing for updating the program to be executed by the subordinate microcomputer 30 is performed by the master microcomputer 10. In the update processing, the master microcomputer 10 stores a new program in the memory 32 of the subordinate microcomputer 30. The memory 32 of the subordinate microcomputer 30 can store a plurality of programs, such as a pre-update program and a post-update program. After completing storing the post-update program in the memory 32, by the master microcomputer 10 giving the selection instruction for executing the post-update program to the subordinate microcomputer 30, the subordinate microcomputer 30 can execute the post-update program stored in the memory 32.

Furthermore, the subordinate microcomputer 30 includes information regarding an error that has occurred in its processing in the periodic message and transmits the periodic message. Accordingly, upon receiving the periodic message, the master microcomputer 10 can grasp the error that has occurred in the subordinate microcomputer 30, and can perform processing such as recovering from the error.

Second Embodiment

Figure 9:
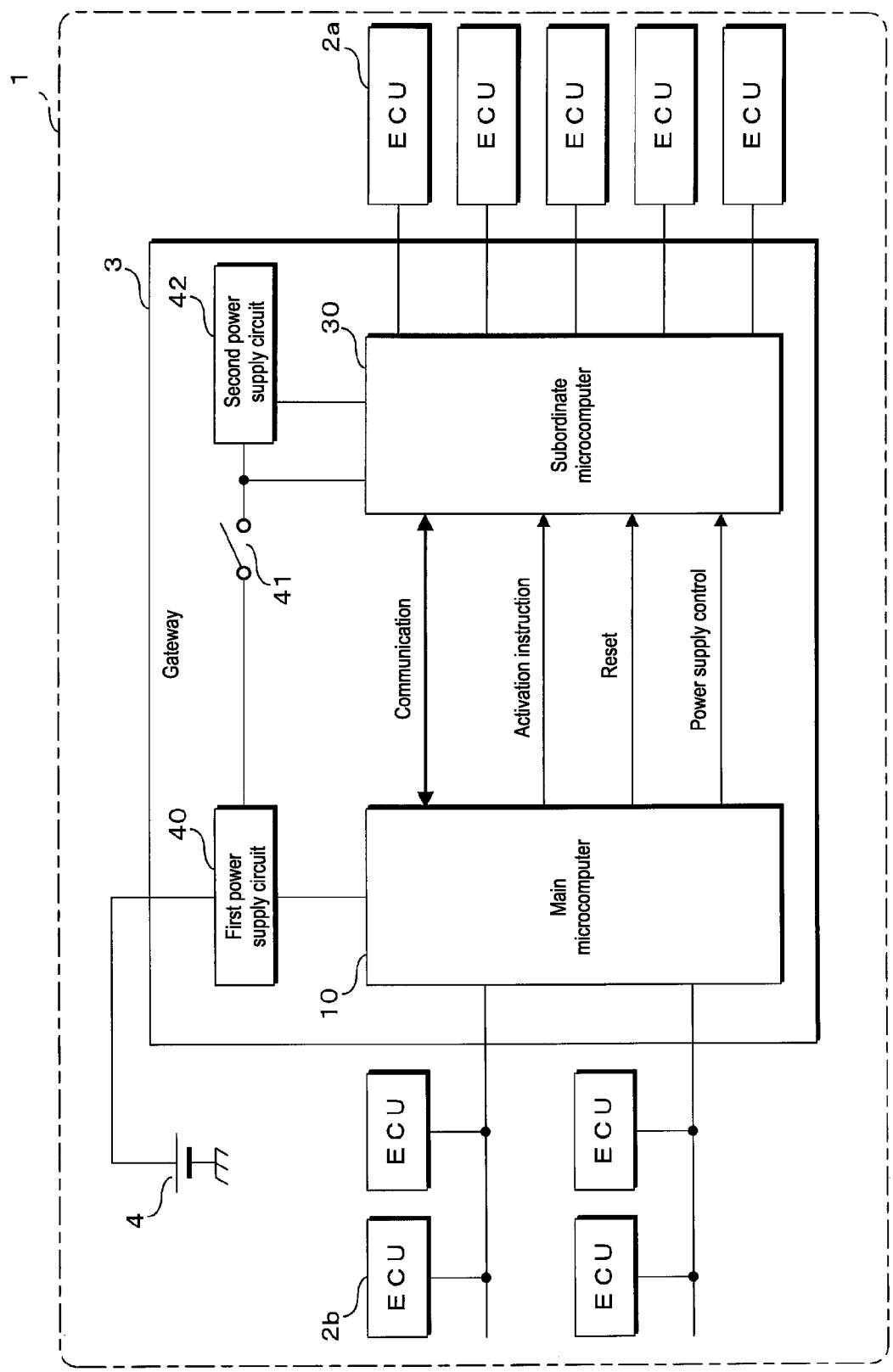
FIG. 9 is a block diagram showing a configuration of a gateway according to a second embodiment.

In a second embodiment, the subordinate microcomputer detects an abnormality in the supplied voltage. In a configuration of a gateway 3 according to the second embodiment, configurations similar to that of the first embodiment are given the same reference numerals and the description thereof will be omitted. FIG. 9 is a block diagram showing a configuration of the gateway 3 according to the second embodiment. As shown in FIG. 9, power is supplied from the battery 4 of the vehicle 1 to the gateway 3. The gateway 3 further includes a first power supply circuit 40, a switch 41, and a second power supply circuit 42.

The positive electrode of the battery 4 is connected to the master microcomputer 10 via the first power supply circuit 40. The negative electrode of the battery 4 is grounded. One end of the switch 41 is connected to the first power supply circuit 40 and the other end of the switch 41 is connected to the subordinate microcomputer 30 and the second power supply circuit 42. The second power supply circuit 42 is further connected to the subordinate microcomputer 30.

Power is supplied from the battery 4 to the master microcomputer 10 via the first power supply circuit 40. Power is supplied to the subordinate microcomputer 30 via the first power supply circuit 40 and the second power supply circuit 42 by turning the switch 41 ON, and power supply is interrupted by turning the switch 41 OFF. Turning ON/OFF of the switch 41 is controlled by the master microcomputer 10.

The battery 4 is, for example, a 12 V battery. The first power supply circuit 40 is, for example, a switching regulator, and converts the voltage supplied from the battery 4 to 3.3 V and output the resultant voltage. Also, the second power supply circuit 42 is a linear regulator, for example, and when the switch 41 turns ON, converts the voltage that is output from the first power supply circuit 40 to 1.0 V, and outputs the resultant voltage to the subordinate microcomputer 30. Power is supplied to the second power supply circuit 30 through the two systems, that is, the first power supply circuit 40 and the second power supply circuit 42.

Figure 10:
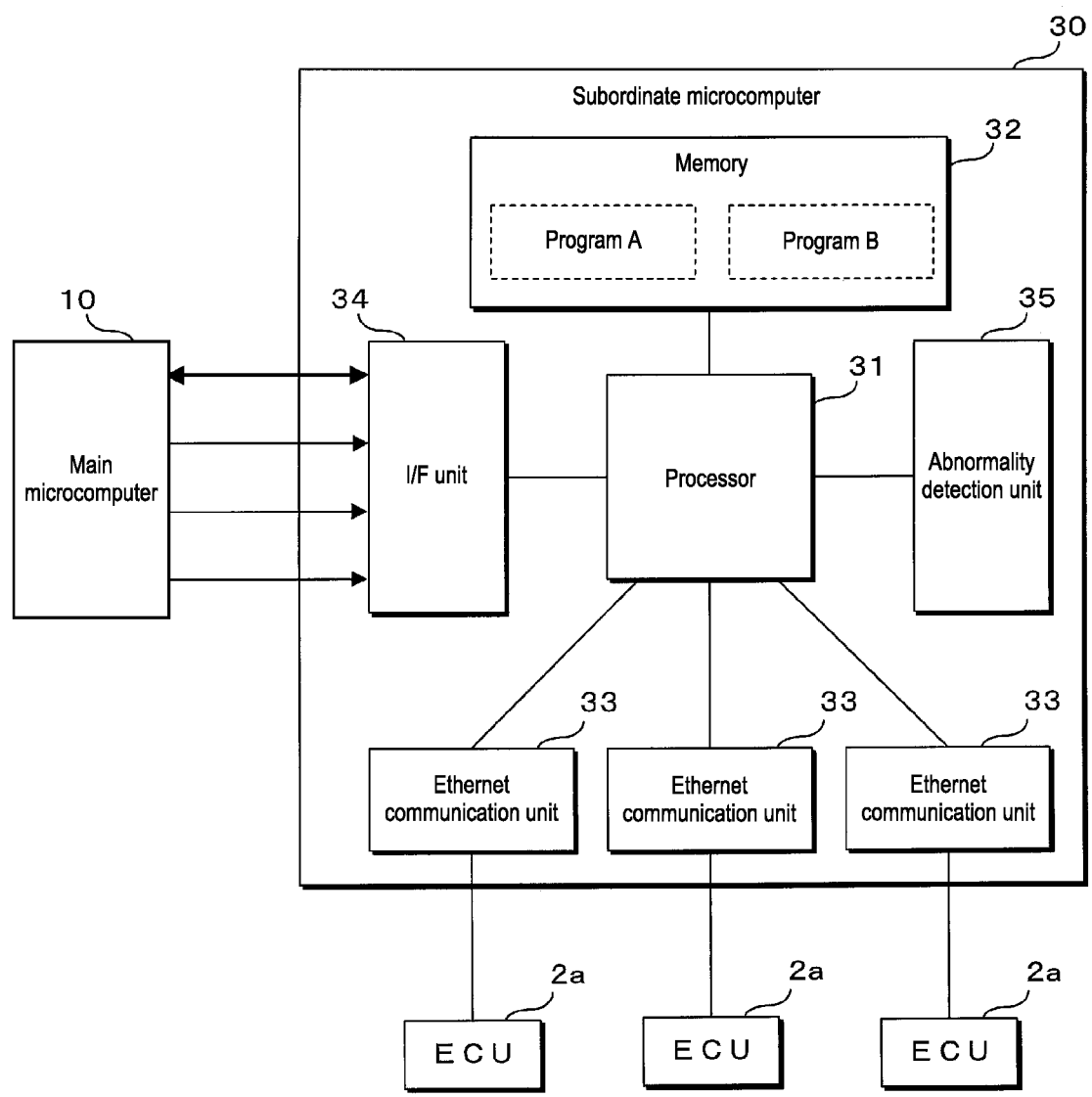
FIG. 10 is a block diagram showing a configuration of a subordinate microcomputer according to the second embodiment.

FIG. 10 is a block diagram showing the configuration of a subordinate microcomputer 30 according to the second embodiment. Similarly to the first embodiment, the subordinate microcomputer 30 includes the processor 31, the memory 32, the Ethernet communication unit 33, and the I/F unit 34. The subordinate microcomputer 30 further includes an abnormality detection unit 35. Here, in the subordinate microcomputer 30, power from the second power supply circuit 42 is supplied to core components of the processor 31, and power from the first power supply circuit 40 is supplied to other constituent components.

When the voltage supplied from the first power supply circuit 40 and the second power supply circuit 42 becomes less than a threshold, the abnormality detection unit 35 outputs a signal indicating an abnormality to the processor 31. In other words, the abnormality detection unit 35 detects an abnormality that the supplied voltage is excessively low. The abnormality detection unit 35 includes a comparator, for example, and compares the voltage that is input to the subordinate microcomputer 30 and the threshold voltage using the comparator, and detects an abnormality based on the result of the comparison. The threshold of the voltage is set to the lower limit value of the voltage that guarantees the predetermined operations in the subordinate microcomputer 30.

Note that the abnormality detection unit 35 may also detect a high-voltage abnormality, instead of or in addition to the low-voltage abnormality. Here, a high-voltage abnormality is that a voltage that exceeds the upper limit value of the range of the voltage that guarantees the predetermined operations is input to the subordinate microcomputer 30. The high-voltage abnormality is detected by, for example, the upper limit value being set to the threshold relating to the abnormality detection unit 35, and comparing the supplied voltage and the threshold value using the comparator, based on whether the supplied voltage exceeds the threshold.

The processor 31 stores the input information in the memory 32, for example, and outputs the information to the master microcomputer 10 as error information. Similarly to the first embodiment, the processor 31 transmits the periodic message including the error information to the master microcomputer 10, as shown in steps S23 to S25 in FIG. 7.

The low-voltage error information uses 2 bits per the power for the two systems in the data of the periodic message, for example. In this case, the processor 31 transfers information indicating whether a low-voltage abnormality has occurred in a single bit per one system.

Similarly to the first embodiment, upon receiving the periodic message, if the master microcomputer 10 obtains the error information regarding the low-voltage abnormality, the master microcomputer 10 resets or stops the subordinate microcomputer 30, as shown in steps S34 to S38 in FIG. 8.

With the configuration described above, it is possible to grasp an abnormality in the voltage supplied to the battery 4 or the subordinate microcomputer 30, and prevent the operational malfunction of the subordinate microcomputer 30 due to being supplied with a voltage higher or lower than the range of the voltage regarding the predetermined operations in the subordinate microcomputer 30. Also, by detecting the low-voltage abnormality by the abnormality detection unit 35, it is possible to prevent the operational malfunction of the subordinate processing unit due to being supplied with a voltage lower than the range of voltage that is predetermined in the subordinate microcomputer 30 caused by a drop of the voltage supplied to the battery 4.

Note that although one subordinate microcomputer 30 is included in the gateway 3 in the first and second embodiments, there is no limitation to this, and a plurality of subordinate microcomputers 30 may also be included. Also, the gateway 3 and the ECUs 2a and 2b are mounted in the vehicle 1 in the first and second embodiments, but there is no limitation to this. The present technique can also be applied to communication devices other than in-vehicle communication devices. Furthermore, the processing units that perform processing such as relaying the messages and the like are microcomputers, but there is no limitation to this. The processing units may also be various kinds of processing units other than microcomputers. Furthermore, the communication performed in the vehicle 1 is performed in compliance with communication standards such as CAN and Ethernet, but there is no limitation to this. Communication performed in the vehicle 1 may also be performed in compliance with other communication standards such as the Flex Ray. Furthermore, the subordinate microcomputer 30 transmits periodic messages including error information to the master microcomputer 10, but there is no limitation to this. The periodic messages may also include no error information. Furthermore, in the second embodiment, power supply to the master microcomputer 10 is through one system, and power supply to the subordinate microcomputer 30 is through two systems, but there is no limitation to this. The power supply to the master microcomputer 10 and the subordinate microcomputer 30 may also be through a single system or a plurality of systems.

The embodiments disclosed herein are to be considered as illustrative and non-limiting in all aspects. The scope of the present disclosure is not indicated by the above-described meanings but is indicated by the claims, and all modifications that fall within the meaning and range of equivalency with the claims are intended to be encompassed therein.

The invention claimed is:

1. A communication device comprising:
a master processing unit; and
a subordinate processing unit,
wherein the master processing unit and the subordinate processing unit are connected by a communication line for transmission and reception of a message, an activation signal line for exchanging a binary activation signal regarding an activation of the subordinate processing unit, and a reset signal line for exchanging a binary reset signal for resetting the subordinate processing unit,
the subordinate processing unit performs processing regarding communication,
the master processing unit controls activation of the subordinate processing unit, using the activation signal,
the subordinate processing unit periodically transmits a signal to the master processing unit, through the communication line,
the master processing unit controls an operation of the subordinate processing unit in accordance with the signal that is periodically transmitted by the subordinate processing unit,
the subordinate processing unit selectively executes, in accordance with the activation signal, a plurality of programs that are stored in a storage unit,
the master processing unit gives a selection instruction as to which of the programs is to be executed by the subordinate processing unit, using the activation signal,
the signal that is periodically transmitted by the subordinate processing unit includes information indicating which of the programs is being executed,
the plurality of programs include a pre-update program and a post-update program,
the master processing unit
transmits an update program to the subordinate processing unit through the communication line,
switches a value of the activation signal after ending transmission of the update program, and
performs processing for updating a program to be executed by the subordinate processing unit by resetting the subordinate microcomputer using the reset signal after switching the value of the activation signal.

2. The communication device according to claim 1, wherein the master processing unit subjects the subordinate processing unit to a predetermined control if the master processing unit does not receive the signal for a predetermined time period.

3. The communication device according to claim 2, wherein the master processing unit performs control for reactivating or stopping the subordinate processing unit as the predetermined control.

4. The communication device according to claim 1, wherein the signal that is periodically transmitted by the subordinate processing unit includes information regarding an error that has occurred in processing performed by the subordinate processing unit.

5. The communication device according to claim 4, wherein the information regarding the error is information regarding an abnormality in a voltage that is supplied to the subordinate processing unit.

6. The communication device according to claim 5, wherein the abnormality in the voltage is that a value of the voltage drops to less than a predetermined value.

7. A control method performed in a communication device that includes a subordinate processing unit that performs processing regarding communication and a master processing unit that controls activation of the subordinate processing unit, the master processing unit and the subordinate processing unit being connected by a communication line for transmission and reception of a message, an activation signal line for exchanging a binary activation signal regarding an activation of the subordinate processing unit, and a reset signal line for exchanging a binary reset signal for resetting the subordinate processing unit,
the method comprising:
the master processing unit controlling activation of the subordinate processing unit, using the activation signal,
the subordinate processing unit periodically transmitting a signal to the master processing unit, through the communication line; and the master processing unit controlling an operation of the subordinate processing unit in accordance with the signal that is periodically transmitted from the subordinate processing unit, the subordinate processing unit selectively executing a plurality of programs that are stored in a storage unit in accordance with the activation signal, the master processing unit giving a selection instruction as to which of the programs is to be executed by the subordinate processing unit, using the activation signal, the signal that is periodically transmitted by the subordinate processing unit including information indicating which of the programs is being executed, the plurality of programs including a pre-update program and a post-update program, and the master processing unit executing the following steps:
transmitting an update program to the subordinate processing unit through the communication line,
switching a value of the activation signal after ending transmission of the update program, and
performing processing for updating of a program to be executed by the subordinate processing unit by resetting the subordinate microcomputer using the reset signal after switching the value of the activation signal.

8. The communication device according to claim 2, wherein the signal that is periodically transmitted by the subordinate processing unit includes information regarding an error that has occurred in processing performed by the subordinate processing unit.

9. The communication device according to claim 3, wherein the signal that is periodically transmitted by the subordinate processing unit includes information regarding an error that has occurred in processing performed by the subordinate processing unit.

* * * * *